United States Patent [19]

Duvdevani et al.

[11] Patent Number: 4,586,937

[45] Date of Patent: * May 6, 1986

[54] ANTIMISTING SYSTEM FOR HYDROCARBON FLUIDS

[75] Inventors: Ilan Duvdevani, Leonia; John A. Eckert, Mountainside; Donald N. Schulz, Annandale; Kissho Kitano, Fanwood, all of N.J.

[73] Assignee: Exxon Research and Engineering Co., Florham Park, N.J.

[ * ] Notice: The portion of the term of this patent subsequent to Jun. 18, 2002 has been disclaimed.

[21] Appl. No.: 625,973

[22] Filed: Jun. 29, 1984

Related U.S. Application Data

[63] Continuation-in-part of Ser. No. 565,105, Dec. 23, 1983, abandoned.

[51] Int. Cl.$^4$ .............................................. C10L 1/18
[52] U.S. Cl. .......................................... 44/62; 44/70; 525/329.5; 524/562
[58] Field of Search .................. 44/62, 70; 525/329.5; 524/562

[56] References Cited

U.S. PATENT DOCUMENTS

| | | | |
|---|---|---|---|
| 2,599,119 | 6/1952 | McQueen | 524/562 |
| 4,002,436 | 1/1977 | Osmond et al. | 44/62 |
| 4,240,928 | 12/1980 | Ueno et al. | 526/144 |
| 4,263,196 | 4/1981 | Schumacher et al. | 524/562 |
| 4,381,414 | 4/1983 | Beach et al. | 44/62 |

Primary Examiner—Mrs. Y. Harris-Smith
Attorney, Agent, or Firm—Richard E. Nanfeldt

[57] ABSTRACT

An antimisting hydrocarbon solution comprising a hydrocarbon mixed with a copolymer of an alphaolefin and a vinyl alkylenecarboxylic acid, wherein the concentration of said copolymer in said hydrocarbon is about 0.05 to about 2 grams per 100 ml of said solution, wherein said copolymer has the formula:

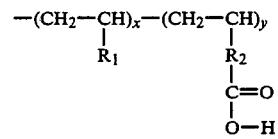

wherein $R_1$ is an alkyl group having about 1 to about 25 carbon atoms, $R_2$ is an alkylene group having about 3 to 17 carbon atoms, x is about 95.0 to about 99.99 mole % and y is about 0.01 to about 5 mole %.

3 Claims, No Drawings

ANTIMISTING SYSTEM FOR HYDROCARBON FLUIDS

CROSS-REFERENCE TO RELATED APPLICATIONS

This application is a continuation-in-part of U.S. Ser. No. 565,105, filed Dec. 23, 1983, now abandoned.

FIELD OF THE INVENTION

The present invention relates to hydrocarbon, preferably jet fuel solutions having antimisting properties in which the hydrocarbon solution contains a copolymer of an alpha olefin and a vinyl alkylenecarboxylic acid.

BACKGROUND OF THE INVENTION

Polymeric materials are useful as viscosity enhancers when dissolved in the appropriate solvent system. The principle reason for this behavior is due primarily to the large volume which a single macromolecular chain can occupy within the solvent. An increase in the size of the chain produces a concomitant enhancement in the solution viscosity. However, when the polymer chain is placed in a shear field, segmental orientation takes place in the direction of the shearing force. The viscosity of the fluid dramatically drops due to this orientation phenomena. This is a typical behavior of most solutions containing dissolved polymeric materials. However, if the polymer molecule has a high molecular weight with a relatively flexible backbone and the solvent viscosity is sufficiently high, different behavior can be anticipated. It has been shown by several groups that, with increasing shear rates, the viscosity should show a decrease, followed by a minimum value and a small subsequent increase in cases where both solvent viscosity and polymer molecular weight are very high. This latter effect gives rise to a slight dilatant behavior. However, the above-mentioned conditions required for the appearance of a slight shear thickening behavior in these polymeric solution systems are not applicable for many technologically interesting fluids. In most of the common synthetic polymers, it is difficult from a synthetic viewpoint to obtain sufficiently high molecular weight and, in addition, most solvents (for example, jet fuels) have rather low viscosities.

U.S. Pat. No. 4,002,436 discloses hydrocarbon jet fuel compositions of addition polymers with associative polar bonds. However "the polymers used in [that] invention will generally be of the free radical addition type since these are the simplest to make in the presence of polar groups" (column 4, lines 16–18). Alkene hydrocarbon or alpha olefin polymers usually require post polymerization reaction to introduce the polar groups and are thus generally excluded from this invention (column 4, lines 58–68, and column 5, lines 1–3). Moreover, compositions of U.S. Pat. No. 4,002,436 make no claims to showing dilatant or shear thickening rheology (i.e. instantaneous increase in viscosity, with increasing shear rate).

This invention discloses the novel and unexpected result that polymers containing low levels of carboxylic acid side groups are capable of enhancing the viscosity of hydrocarbon solutions under relatively broad shear conditions. With these unique polymeric materials, dilatant behavior occurs in hydrocarbon fluids which are of broad technological utility and useful in antimisting applications, preferably for jet fuel. It is further observed that under the identical experimental conditions, the viscosity of related copolymer solutions containing no carboxylic acid side groups show the normal shear thinning behavior.

Polymers with very high molecular weight can be used to modify a solvent for antimisting behavior. In this invention it is disclosed that an alternative to ultra high molecular weight additives are lower molecular weight polymers which are capable of associating in solution, thereby building a network of a very high molecular weight. A way for achieving such networks is the association of polymers containing a low level of carboxylic acid side groups.

In order to avoid phase separation of the associating polymer in solution, the acid density along the polymer backbones should be relatively low. The resulting solution of such a polymer is then significantly more viscous than solutions containing related polymers which do not associate. Upon addition of a strongly polar agent such as an alcohol the associations can be disturbed and the viscosity reduced.

It was found that for a given range of the various parameters that may be varied in a carboxylic acid containing polymer solution, an unexpected shear thickening (dilatant) behavior may be obtained. These parameters include:

Backbone nature of the polymer (or copolymer).
The polar group densities along the polymer backbones.
The molecular weight of the polymer.
The solvent (and cosolvent, if any).
The concentration of polymer in solution.

As explained above, most solutions of high molecular weight polymers are expected to exhibit a shear thinning behavior. Polymers containing carboxylic acid side groups under narrow conditions seem on the other hand to possess an ability to establish even larger networks or act as if networks are larger under high shear rates resulting in shear thickening.

Shear thickening behavior can be useful in affecting antimisting characteristics. Such a solution can behave as a fairly low viscosity fluid at low shear rates. However, the viscosity begins to rise as the shear rate is progressively increased. Accordingly, the solution can more effectively resist breakup into a mist of minute droplets. This is a very desirable attribute in a variety of fluids of technological interest and specifically jet fuels. Another desirable attribute is to be able to reverse (or erase) the above-mentioned antimisting behavior and render it atomizable. With regard to polymers of the instant invention, this is readily achieved through addition of a soluble component capable of weakening or totally disrupting the associations which hold the network together. Such a component should be highly polar, soluble in the solution containing the dissolved associating polymer and capable of efficiently migrating (and disrupting) the associations. Alcohols and amines and low molecular weight carboxylic acids are only a few of many possible examples.

U.S. Pat. No. 3,679,382 teaches the thickening of aliphatic hydrocarbons with synthetic organic polymers of alkylstyrene or lauryl acrylate and olefinically unsaturated emulsion copolymerizable acids, amides, hydroxyacrylic esters, sulfonic acids, etc. It is emphasized in this patent (column 3, lines 69–75) that it is critical that in the preparation of such polymers, no surface active agent, catalyst or other additive be employed which introduces a metallic ion into the system.

Therefore, it is preferred to employ ammonium or amine salts.

The instant invention contains no alkylstyrenes or lauryl acrylates and the instant olefinically unsaturated acids and esters are not emulsion copolymerizable. The instant acids and esters have an alkyl spacer group separating the acid or ester from the olefinic double bond thus rendering them nonpolymerizable by free radical emulsion polymerization. The instant copolymers are prepared by Ziegler-Natta polymerization which do indeed use metallic catalysts. Such metallic species are precluded from U.S. Pat. No. 3,679,382.

Finally, the novel polymeric systems described here are readily soluble in aliphatic as well as aromatic hydrocarbons making them useful as additives to jet fuels and other distillates of crude oil.

SUMMARY OF THE INVENTION

The present invention relates to hydrocarbon, specifically jet fuel, solutions having dilatant properties in which the hydrocarbon solution contains a copolymer having carboxylic acid side groups.

GENERAL DESCRIPTION OF THE INVENTION

The hydrocarbon solution of the instant invention, which exhibits antimisting properties, are copolymers of an alpha olefin and a vinyl alkylenecarboxylic acid.

The copolymer complex is characterized as having polymer backbones which are substantially soluble in the organic liquid, and pendant $(CH_2)_8$ COOH alkylenecarboxylic acid side groups.

The copolymer of the instant invention is a copolymer containing an alpha olefin and a vinyl alkylenecarboxylic acid having about 4 to about 20 carbon atoms, more preferably about 9 to about 18 and most preferably about 10 to about 16, wherein an alkyl group is situated between the acid or ester group and the carbon of the double bond of the monomer, wherein the resulting alkylenecarboxylic acid side groups are randomly distributed along the alpha-olefin backbone. The alpha-olefin has about 3 to about 27 carbon atoms, more preferably about 6 to about 25, and most preferably about 6 to about 18. The copolymer contains about 0.01 to about 5 mole % of the alkylenecarboxylic acid side groups more preferably about 0.05 to about 3 and most preferably about 0.1 to about 2. The number average molecular weight as measured by GPC of the alpha-olefin copolymer is about 10,000 to about 20,000,000, more preferably about 50,000 to about 15,000,000, and most preferably about 100,000 to about 10,000,000. The copolymer of the alpha-olefin and vinyl alkylenecarboxylic acid is formed by hydrolyzing with a base hydrolysis, wherein the hydrolysis occurs in a solvent which is inert itself to hydrolysis such as an aliphatic or aromatic hydrocarbon. The base hydrolysis of the copolymer of an alpha-olefin and a vinyl alkylene ester is represented by the reaction scheme:

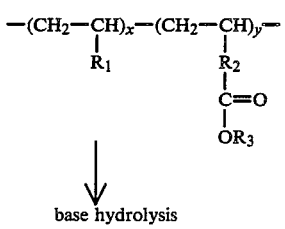

base hydrolysis

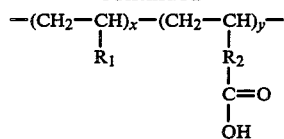

wherein $R_3$ is an alkyl group having about 1 to about 25 carbon atoms, wherein $R_1$ is an alkyl group having about 1 to about 25 carbon atoms, $R_2$ is an alkylene group having about 3 to about 17 carbon atoms, x is about 99.99 to about 95.0 mole %, more preferably about 99.95 to about 97.0 and most preferably about 99.90 to about 98.0, and y is about 0.01 to about 5.0 mole %, more preferably about 0.05 to about 3.0 and most preferably about 0.1 to about 2.0. y comprises carboxylic acid containing units, since the hydrolysis is substantially complete. The final hydrolyzed product is the acid species, wherein at least about 98 wt. % of ester species has been hydrolyzed to the acid species, more preferably 99 wt. % and most preferably 99.5 wt.%. The bases used in the hydrolysis of the ester species are selected from the group consisting of $tBuO^-$, $OH^-$, $EtO^-$, $nBuO^-$, and $PrO^-$.

The hydrocarbon solution of the copolymer of the alpha-olefin and the vinylalkylenecarboxylic acid which exhibits antimisting properties is formed by forming a solution of the copolymer in an organic liquid, wherein the organic liquid which has a solubility parameter of less than 9.5 and is selected from the group consisting of mineral oil, synthetic oil, alkanes, cycloalkanes and aromatics and mixtures thereof. The concentration of the copolymer in the solution is about 0.05 to about 2 grams per 100 ml of organic liquid, more preferably about 0.1 to about 0.5.

The method of the instant invention includes optionally incorporating a solar cosolvent in order to weaken or totally disrupt the associations which weld the intercomplex polymer together thereby reserving the shear thickening phenomonea. For example, a polar cosolvent can be added into the mixture of organic liquid and polymer complex, to solubilize the pendant carboxylic acid groups. The polar cosolvent will have a solubility parameter of at least 10.0, more preferably at least 11.0, and may comprise from 0.1 to 40, preferably 0.5 to 20 weight percent of the total mixture of organic liquid, ionomeric polymer, and polar cosolvent.

There is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S_p$, then we require that:

$$S_p \geq S_L + 1.0$$

In other words, the polar cosolvent will be substantially more polar than the organic liquid to be thickened.

Normally, the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent.

The copolymers of the instant invention are improved antimisting agents for organic liquid as compared to the copolymers of U.S. Ser. No. 565,105 filed Dec. 23, 1983 because they are able to perform as effective antimisting agents while imposing a lower shear viscosity at lower shear rates. The lower shear viscosity of the organic liquid solution is important for the ease of pumping and flow.

DESCRIPTION OF THE PREFERRED EMBODIMENTS

The following are preferred embodiments of the instant invention.

EXAMPLE 1

Synthesis of Poly(1-octene) having alkylenecarboxylic acid side chains

Copolymerization of 1-octene and methyl-10-undecenoate

A 2-liter flask was charged with a mixture of n-heptane (480 ml), 1-octene (500 ml), methyl-10-undecenoate (6.4 g), and diethyl aluminum chloride (72 m mole), were heated to 60° C. The catalyst containing $TiCl_3$ (2.0 g) in N-heptane (20 ml) (described in U.S. Pat. No. 4,240,928) was then added. After stirring for 1 hr, the reaction was terminated with a small amount of isopropyl alcohol. The polymer was precipitated and washed with isopropyl alcohol and vacuum dried at 60° C. to yield 87.9 g of colorless material. IR spectrum showed that the copolymer contains 0.8 mole % of methyl-10-undecenoate unit. The inherent viscosity was 4.3 dl/g in a decalin solution. $\overline{M}n$ was about $4.6 \times 10^6$ as measured by GPC.

EXAMPLE 2

Base Hydrolysis (10959-36) (#10)

A flask was charged with a solution of 1-octene-methyl-10-undecanoate copolymer (40.9) in 200 g THF and 0.82 g t-BuOK. The solution was heated to 50°-60° C. After one hour another 150 ml THF was added and 3.6 ml of 2N $H_2SO_4$ was added to neutralize the solution (pH=5). After cooling, the polymer was precipitated in 600 ml of water/isopropanol (1:1 vol./vol.). The polymer was filtered washed with water and isopronol, and dried to yield 4.0 g of product which had about 100% of the original ester groups hydrolyzed by IR. The viscosity of this polymer in xylene (2%) was 19 cps. at 30 $s^{-1}$.

EXAMPLE 3

Flow in a Tubless Siphon for Solutions in Jet Fuel

A solution of a hydrolyzed copolymer of 1-octene and methyl-10-undecenoate was prepared in jet fuel A. The copolymer was hydrolyzed by base hydrolysis and was similar to the one in Example 2. The solution was prepared by first dissolving 5 weight percent of the copolymer in xylene and then diluting it with jet fuel A to obtain a 0.5 weight percent copolymer in a mixture of xylene and jet fuel A where jet fuel A was about 90 weight percent of the mixture. This solution was then studied in a tubeless siphon flow and the height at which the unsupported fluid column broke was recorded. The solution was then further diluted with jet fuel A to various lower concentrations which were also studied in tubeless siphon flow. The column heights at break for the various concentrations of the polymer solutions in jet fuel A (and a minor proportion of xylene) were:

| Polymer Concentration (wt %) | Column Height (mm) |
| --- | --- |
| 0.5 | 8 |
| 0.4 | 5.8 |
| 0.3 | 5.5 |
| 0.2 | 4 |
| 0.1 | 2 |

The above solution at 0.3 weight percent polymer was nearly newtonian with a shear viscosity of 2.87 cP at 30 $sec^{-1}$ and a slight decrease to 2.67 cP at 300 $sec^{-1}$.

This example demonstrates the low shear viscosity of a jet fuel solution with a base hydrolyzed copolymer while demonstrating flow in a tubeless siphon. Therefore, such solutions are expected to be antimisting with the advantage of pumpability and ease of flow.

EXAMPLE 4

Destruction of Antimisting Properties

A solution of jet fuel A containing a copolymer similar to the ones used in Examples 2 and 3 was prepared at a polymer concentration of 0.3 weight percent. The solution was subjected to a flow in a tubeless siphon and it produced a 5.5 mm unsupported column of fluid before break which is the same height shown for the identical concentration in Example 3.

Upon addition of stearic acid to the solution the siphon heights before break as a function of stearic acid concentrations were:

| Stearic Acid (ppm) | Column Height (mm) |
| --- | --- |
| 0 | 5.5 |
| 1,500 | 4.5 |
| 2,500 | 3.8 |
| 4,000 | 3.0 |

This demonstrates that an addition of a polar material such as stearic acid can act to reduce the antimisting capability of a solution that incorporates the novel polymer.

What is claimed is:

1. An antimisting hydrocarbon solution comprising an organic liquid having a solubility parameter of less than 9.5 mixed with a copolymer having a number average molecular weight of about 10,000 to about 20,000,000, wherein the concentration of said copolymer in said organic liquid is about 0.05 to about 2 grams per 100 ml of said solution, wherein said copolymer has the formula:

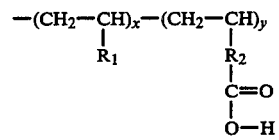

wherein $R_1$ is an alkyl group having about 1 to about 25 carbon atoms, $R_2$ is an alkylene group having about 3 to 17 carbon atoms, x is about 95.0 to about 99.99 mole % and y is about 0.01 to about 5 mole %.

2. The antimisting solution according to claim 1 further including about 1000 ppm to about 10 weight percent of a polar cosolvent.

3. The antimisting solution according to claim 1, wherein said organic liquid is a jet fuel.

* * * * *